United States Patent
Murayama (10) Patent No.: US 8,534,128 B2
(45) Date of Patent: Sep. 17, 2013

(54) METHOD AND SYSTEM FOR ABNORMALITY DIAGNOSIS OF VERY LOW SPEED ROTATING MACHINE

(75) Inventor: Tsunemi Murayama, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 846 days.

(21) Appl. No.: 12/593,195

(22) PCT Filed: Mar. 17, 2008

(86) PCT No.: PCT/JP2008/055351
§ 371 (c)(1),
(2), (4) Date: Sep. 25, 2009

(87) PCT Pub. No.: WO2008/117765
PCT Pub. Date: Oct. 2, 2008

(65) Prior Publication Data
US 2010/0116060 A1 May 13, 2010

(30) Foreign Application Priority Data
Mar. 26, 2007 (JP) .................................. 2007-079915

(51) Int. Cl.
*G01M 13/02* (2006.01)
(52) U.S. Cl.
USPC .................... 73/593; 73/602; 73/659; 73/660
(58) Field of Classification Search
USPC .................. 73/593, 570, 579, 602, 646, 659, 73/660
See application file for complete search history.

(56) References Cited

U.S. PATENT DOCUMENTS

| 4,884,449 A | * | 12/1989 | Nishimoto et al. | 73/660 |
| 5,356,098 A | * | 10/1994 | Post | 246/169 A |
| 6,199,018 B1 | * | 3/2001 | Quist et al. | 702/34 |

(Continued)

FOREIGN PATENT DOCUMENTS

| JP | 3-245054 A | 10/1991 |
| JP | 7-270228 A | 10/1995 |

(Continued)

OTHER PUBLICATIONS

Jamaludin et al. ("Condition monitoring of slow-speed rolling element bearings using stress waves", School of Mechanical Engineering, Cranfield University, UK, 2001.*

(Continued)

*Primary Examiner* — Peter Macchiarolo
*Assistant Examiner* — Samir M Shah
(74) *Attorney, Agent, or Firm* — Birch, Stewart, Kolasch & Birch, LLP (57) ABSTRACT

The present invention provides a high accuracy, inexpensive diagnosis method and system diagnosing an abnormality of a 10 rpm or less very low speed roller bearing using an acoustic signal, that is, detects an acoustic signal emitted from a roller bearing of a 10 rpm or less ultralow speed rotating machine using a sensor having a sound pickup performance of 10 kHz or less, uses frequency analysis to find the spectrum distribution, processes this to obtain the frequency analysis waveform, compares the spectral average value or effective value of a frequency of the natural frequency of the bearing or more of this with a reference value, and judges that the bearing is abnormal when this spectral average value or effective value exceeds the reference value.

8 Claims, 6 Drawing Sheets

(56) References Cited

U.S. PATENT DOCUMENTS

| | | | |
|---|---|---|---|
| 6,484,109 B1* | 11/2002 | Lofall | 702/56 |
| 7,493,238 B2* | 2/2009 | Tanaka et al. | 702/191 |
| 7,539,596 B2* | 5/2009 | Zoll et al. | 702/183 |
| 7,574,326 B2* | 8/2009 | Amanuma et al. | 702/189 |
| 7,659,818 B2* | 2/2010 | Ueno | 340/572.1 |
| 7,705,743 B2* | 4/2010 | Barone et al. | 340/682 |
| 7,715,949 B2* | 5/2010 | Sato et al. | 700/280 |
| 7,821,950 B2* | 10/2010 | Murata et al. | 370/242 |
| 2002/0056398 A1* | 5/2002 | Bachtiger et al. | 105/157.1 |
| 2002/0083779 A1* | 7/2002 | Narita et al. | 73/862.191 |
| 2005/0259903 A1* | 11/2005 | Takizawa et al. | 384/448 |
| 2006/0167659 A1* | 7/2006 | Miyasaka et al. | 702/185 |

FOREIGN PATENT DOCUMENTS

| | | |
|---|---|---|
| JP | 10-160638 A | 6/1998 |
| JP | 11-271181 A | 10/1999 |
| JP | 2005-300517 A | 10/2005 |

OTHER PUBLICATIONS

English Translation of Nakajima JP 11-271181 A.*
Inoue, "Teisoku Kaiten Kikai Shindan no Genjo vol. 3 Kyokuteisoku Kaiten no Jikuuke Shindan (the 1st part)", Plant Enginner, vol. 34, No. 9, Japan Institute of Plant Maintenance, Aug. 27, 2002, pp. 37-41.
Gu, "Research on Diagnosis of Abnormalities in Tumbling Surfaces of Low Rotation Speed Bearings", Inje University, Industrial Safety and Health, pp. 413-418, 2002.

* cited by examiner

METHOD AND SYSTEM FOR ABNORMALITY DIAGNOSIS OF VERY LOW SPEED ROTATING MACHINE

TECHNICAL FIELD

The present invention relates to a method and system for acoustical abnormality diagnosis of a roller bearing of a 10 rpm or less very low speed rotating machine.

BACKGROUND ART

For abnormality diagnosis of rotating machines, due to the superior diagnostic accuracy, judgment by signals detecting vibration of the bearings (hereinafter referred to as "vibration diagnosis") is generally used. This method measures the impact vibration which occurs proportionally to the rotational speed and enables identification of abnormal portions from the intervals of the impact vibration.

However, in general, in the case of 100 rpm or less low speed rotating machines, the vibration occurring along with bearing abnormalities is small and the intervals of occurrence of impact vibration also become longer, so diagnosis has been considered difficult. In particular, in a case of several rpm, very low speed rotating facilities such as the rolls of continuous casting machines, differentiation of signals accompanying abnormalities and noise is difficult and high accurate diagnosis has been impossible.

To improve the accuracy of diagnosis of bearings of such low speed rotating machines, for example, Japanese Patent Publication (A) No. 3-245054 proposes to detect an AE (acoustic emission) signal emitted by bearings, calculate the duration by which the AE signal exceeds a reference value, and judge there is an abnormality when this duration exceeds another reference value.

Further, Japanese Patent Publication (A) No. 7-270228 proposes to use an acceleration sensor to detect bearing vibration, filter the detected signal by a bandpass filter, then process it by envelope processing, compute a difference between a largest value and smallest value of the waveform signal obtained in a predetermined time interval, and judge there is an abnormality when this difference exceeds a threshold value given in advance so as to thereby automatically diagnosis abnormalities of a low speed rotating machine.

Further, Japanese Patent Publication (A) No. 10-160638 proposes a method of using an acceleration sensor to detect bearing vibration, obtain output of a predetermined value or less from that detected signal by a low pass filter, process this by multiplying it by an odd number of 3 or more, and compare this waveform with a reference value set in advance so as to judge if there is an abnormality.

DISCLOSURE OF THE INVENTION

In the method disclosed in Japanese Patent Publication (A) No. 3-245054, there were the problems that the noise of the AE signal and the meaningful signal were difficult to differentiate, diagnosis was possible only at the time when a crack progressed, and an AE signal is in general a high frequency band exceeding 100 kHz, so the system became expensive.

Further, with the method disclosed in Japanese Patent Publication (A) No. 7-270228, the vibration signal in a very low speed rotary bearing with a small vibration force is small and differentiation of signals accompanying abnormalities and noise is difficult, so high accurate diagnosis was impossible.

The method disclosed in Japanese Patent Publication (A) No. 10-160638 as well enlarges the signal component accompanying abnormalities by processing multiplying it by an odd number of 3 or more, but the vibration detection method is the same as the above second patent document and processes the noise as well, so could not be said to be able to accurately diagnose abnormalities.

Therefore, the present invention has as its object the provision of a method and system of diagnosis utilizing an acoustic signal enabling inexpensive and high accurate diagnosis of a large number of roll bearings at a very low speed of 10 rpm or less such as in a continuous casting machine.

In the self-aligning roller bearings used frequently for bearings for continuous casting facilities, due to their distinctive differential slip and also the failure to form a sufficient oil film at a very low speed and heavy load and due to insufficient lubrication due to entry of scale and water, the oil film breaks and wear progresses. As a result, flaking occurs. If this progresses, cracks will form leading to fracture.

However, even if fractures occur, unless there is seizing, abnormal wear of the rolling surfaces, etc. due to skew of the rollers, since the speed is very low speed, there will be no rapid progress in the damage. Therefore, if able to detect an abnormality at this stage, use is possible up to the limit of the lifetime, so this is not too late as the timing for detection of abnormalities. Rather, it can be said to be preferable from the viewpoint of the maintenance costs.

An object of the present invention is to provide a method and system of diagnosis for detecting abnormalities of very low speed rotating bearings in the state where the rolling members are rotating soundly even though the rolling surfaces of the bearings have cracked. Its gist is as follows:

(1) A method for abnormality diagnosis of a roller bearing of a very low speed rotating machine comprising detecting an acoustic signal emitted from a roller bearing of a rotating machine accompanying very low speed rotation of 10 rpm or less being diagnosed so as to diagnose any abnormality in the same, said method for abnormality diagnosis of a roller bearing of a very low speed rotating machine characterized by
using a sensor having a sound pickup function to detect sound emitted from a bearing being detected as sound pressure, suitably amplifying it to obtain an acoustic signal, and finding a spectrum distribution of the same by frequency analysis,
finding a spectral average value or effective value of a frequency of more than or equal to the natural frequency of the bearing from a frequency analysis waveform obtained by said frequency analysis, and
comparing said spectral average value or effective value with a separately found reference value and judging the bearing to be abnormal when exceeding said reference value.

(2) A method for abnormality diagnosis of a roller bearing of a very low speed rotating machine as set forth in said (1) characterized by bringing a sensor obtaining said acoustic signal into direct contact with said roller bearing.

(3) A method for abnormality diagnosis of a roller bearing of a very low speed rotating machine as set forth in said (1) or (2) characterized by outputting a signal obtained by amplifying said acoustic signal in an audible manner and screening it for judgment of an abnormality.

(4) A method for abnormality diagnosis of a roller bearing of a very low speed rotating machine as set forth in said (3) characterized in that said acoustic signal is one passed through a high frequency band pass filter of the natural frequency of the bearing or more.

(5) A system for abnormality diagnosis of a roller bearing of a very low speed rotating machine detecting an acoustic signal emitted from a roller bearing of the rotating machine being diagnosed along with very low speed rotation of 10 rpm or less so as to diagnose an abnormality of it, said system for abnormality diagnosis of a roller bearing of a very low speed rotating machine characterized by having:

a sensor having a sound pickup function, an amplifier amplifying the acoustic signal obtained by said sensor, a frequency analysis part finding a frequency distribution of said acoustic signal, a storage part of a natural frequency of the bearing, a processing part finding a spectral average value or effective value based on said frequency analysis, a storage part storing a separately found reference value, and an abnormality judgment part comparing said spectral average value or effective value with said reference value to judge if there is any abnormality.

(6) A system for abnormality diagnosis of a roller bearing of a very low speed rotating machine as set forth in said (5) characterized in that said sensor has the function of directly contacting said roller bearing to thereby obtain said acoustic signal as sound pressure.

(7) A system for abnormality diagnosis of a roller bearing of a very low speed rotating machine as set forth in said (5) or (6) characterized by being provided with an output part outputting said amplified acoustic signal in an audible manner.

(8) A system for abnormality diagnosis of a roller bearing of a very low speed rotating machine as set forth in said (7) characterized by being provided with a high frequency band pass filter extracting only a frequency band component of said amplified acoustic signal of more than or equal to the natural frequency of the bearing.

BEST MODE FOR CARRYING OUT THE INVENTION

Below, the present invention will be explained based on the drawings.

Figure 1:
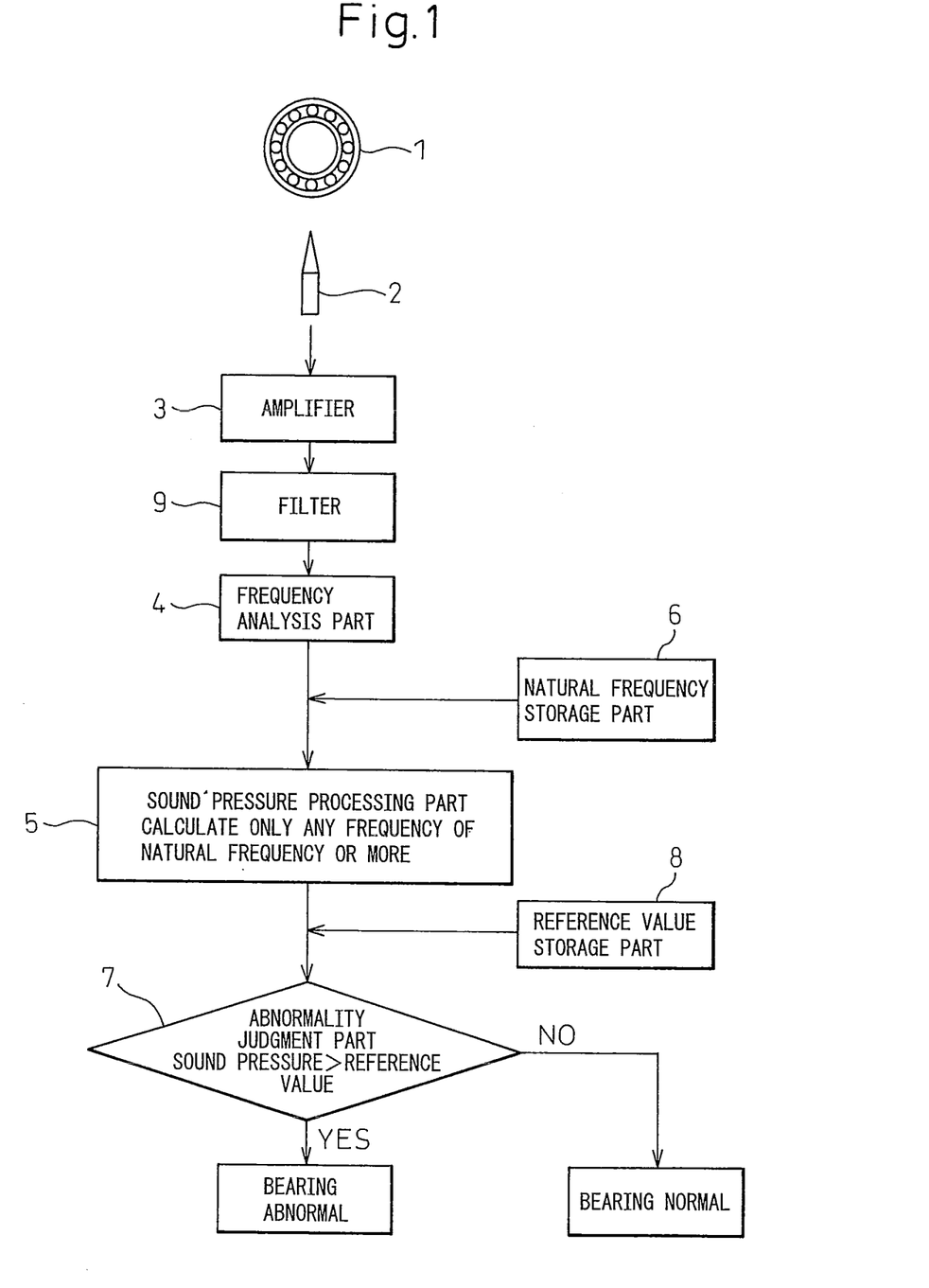
FIG. 1 is a block diagram showing an outline of an embodiment according to claims 1 and 2 of the present invention.
Figure 2:
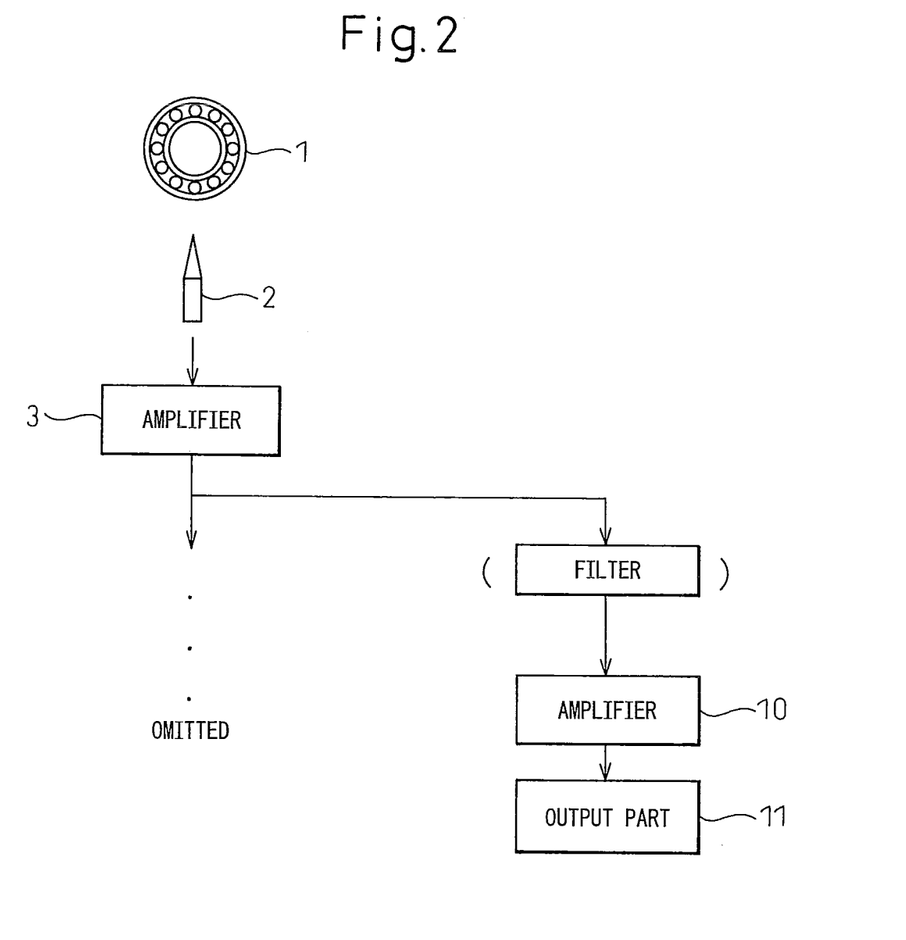
FIG. 2 is a block diagram showing an outline of an embodiment according to claims 3 and 4 of the present invention.

FIG. 1 is a block diagram showing the process of diagnosing an abnormality of an embodiment of the present invention. In FIG. 1, 1 is a detected bearing, 2 a sensor, 3 an amplifier amplifying an acoustic signal, 4 a frequency analysis part, 5 a sound pressure processing part, 6 a natural frequency storage part, 7 an abnormality judgment part, 8 a reference value storage part, and 9 a filter. FIG. 2 has, in addition to the abnormality judgment part of FIG. 1, an amplifier 10 and output part 11 after the filter.

Note that the present invention is not limited to the examples of FIG. 1 and FIG. 2. Their means may be suitably replaced by other known means. Further, the means are not all essential and may be suitably omitted in some cases.

First, the aspects of (1) and (2) of the present invention will be explained.

The aspects of (1) and (2) of the present invention first detect the sound emitted from a detected bearing by the sensor 2 as sound pressure. To obtain the sound pressure excluding sound other than the bearing, a directional microphone is preferably used. In the present example, a sensor storing a microphone in a metal case containing a probe for receiving sound propagated through a solid is used so as to block out background noise and improve the sound pickup performance and so as to improve the durability against dust, cooling water, etc.

If the rolling surface of the bearing cracks, a sound of a higher frequency than the natural frequency of the bearing will be emitted. The inventors investigated this and as a result learned that the natural frequency of the majority of bearings of rotating machines accompanied with very low speed rotation of 10 rpm or less is 100 to 1000 Hz. Therefore, the sensor uses a microphone having a frequency response range of 1 kHz to 10 kHz. If up to 10 kHz, the sensor almost always gives relatively flat frequency characteristics and will not become expensive.

Next, the amplifier 3 is used to amplify the signal level and the frequency analysis part 4 is used to analyze the frequency of the acoustic signal. The natural frequency storage part 6 stores the natural frequency of the bearing inspected. The sound pressure processing part 5 finds the spectral average value or effective value of any set frequency of the natural frequency stored in the natural frequency storage part or more. The abnormality judgment part 7 compares the spectral average value or effective value calculated at the sound pressure processing part 5 with a judgment reference value which had been stored at the reference value storage part 8 and judges a bearing being diagnosed to be abnormal when the calculated sound pressure is larger. The sound frequency occurring when the rolling surface of a bearing cracks is a higher frequency than the natural frequency of the bearing. The inventors investigated this and as a result found that the frequency for finding the spectral average value or effective value is suitably about 3 times or more the natural frequency of the bearing, but that it is preferable to investigate in advance the natural frequencies of the components of the facility being diagnosed other than the bearings and set a frequency band eliminating these natural frequencies. Note that in most of the bearings investigated by the inventors, abnormal frequency could be detected in acoustic signals from natural frequency to 5 kHz.

In the aspects of (3) and (4), an audible sound is output through the amplifier 10. Due to this, first, it is possible to check for an abnormal sound by listening to it and screen bearings deemed to be possibly abnormal. In particular, in the aspect of (4), a filter is used, so it is easy to find abnormal sounds.

EXAMPLES

Example 1

Figure 3:
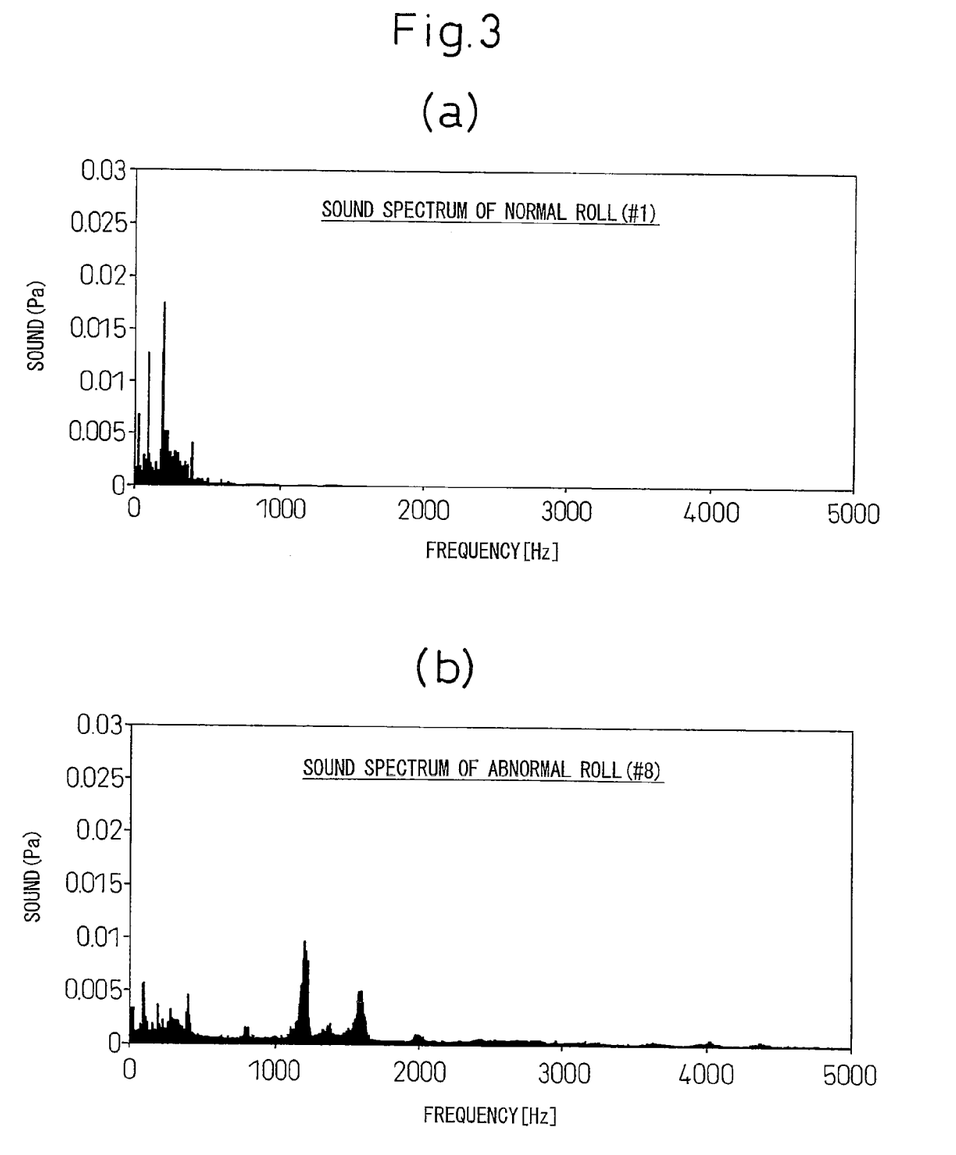
FIG. 3 is a view showing an example of the results of frequency analysis of a normal bearing and abnormal bearing by the method and system of the present invention.
Figure 4:
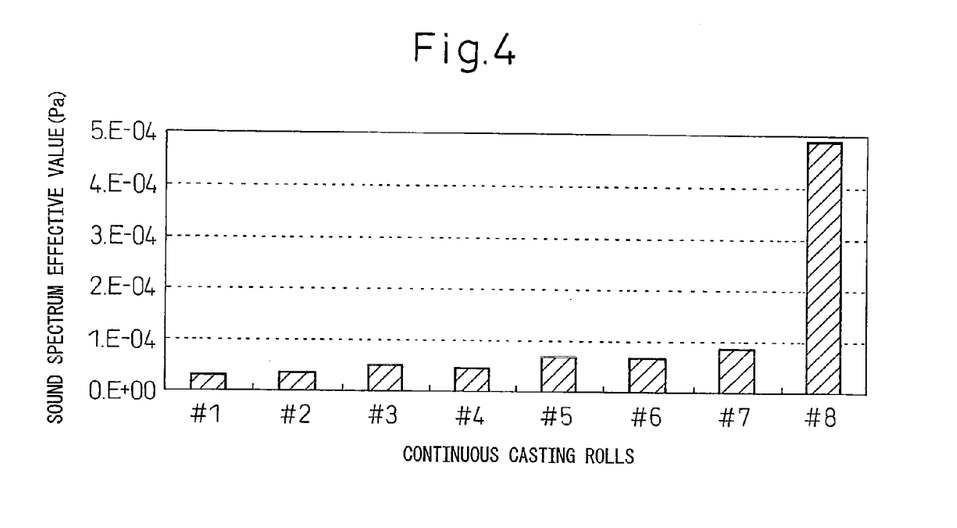
FIG. 4 is a view showing the relationship of an abnormal bearing and normal bearing evaluated by sound of a frequency of 500 Hz or more by the method and system of the present invention.

FIG. 3 and FIG. 4 show the results of analysis of self-aligned roller bearings of continuous casting machines rotating at 0.5 rpm. These were obtained by bringing a microphone into contact with the bearings and are examples where the bearing holders are damaged and rollers clash and the load increases.

FIG. 3(a) shows the sound spectrum of a bearing of a normal #1 roll. The sound pressure of the low frequency region including the natural frequency (in this example, 350 Hz) is dominant. No special characteristics can be found at 500 Hz or more. FIG. 3(b) shows the sound spectrum of a bearing of a damaged #8 roll. The low frequency region of 500 Hz or less is the same as the bearing of the normal #1 roll, but several peaks are seen near 1 to 2 kHz.

FIG. 4 shows the spectral effective value of a frequency of a frequency band of 500 Hz or more for each bearing excluding the frequency band near the natural frequency. With an average sound pressure, as will be understood from FIG. 3, the low frequency region sound pressure is dominant, so the difference between a normal bearing and abnormal bearing is small. Therefore, the sound pressure minus the frequency near the natural frequency was used as an indicator. #1 to 7 are normal bearings. Based on this data and the data of #1 to 8 measured before detecting the abnormalities, here, the abnormality judgment reference value at this bearing was made 2E-04 Pa. This time the effective value of the bearing of the abnormal #8 roll exceeded the abnormality judgment reference value. It became a value 4 times or more that of a normal bearing, so it was possible to easily judge there was an abnormality.

In this example, the difference of sound was remarkable, so screening for judgment of abnormalities by sound without a filter was also easily possible.

Figure 5:
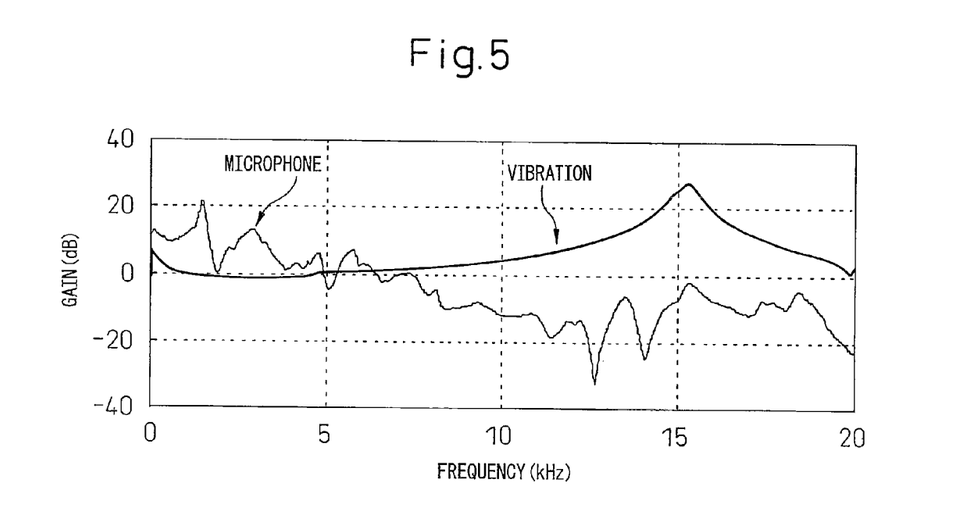
FIG. 5 is a view showing the frequency characteristics in the state of attaching a microphone and vibration sensor by magnets.

Further, FIG. 5 shows the frequency characteristics measuring the response when attaching a microphone and vibration sensor by magnets and making a vibrator vibrate as random noise. This graphs shows that compared with a relatively high sensitivity of the vibration sensor for high frequency vibration of about 8 kHz or more, a microphone exhibits a high sensitivity for vibration of a frequency band of 5 kHz or less. For this reason, it is learned that it is preferable to use a microphone when there are special characteristics near 1 to 2 kHz as in this example.

Note that in this facility, it was possible to detect an abnormality even when there was large damage to the bearing outer race at the opposite side to measurement sharing an axis of rotation with the roller bearing to which the sensor was brought into contact. In this way, sound of a frequency near 2 kHz does not attenuate much due to distance, so it is possible to detect even an abnormal signal of the side opposite to measurement. The side opposite to measurement of this example had been a location which could not be approached during operation due to safety concerns and could not be routinely inspected, but by the present method, it became possible to safely inspect it.

Example 2

Figure 6:
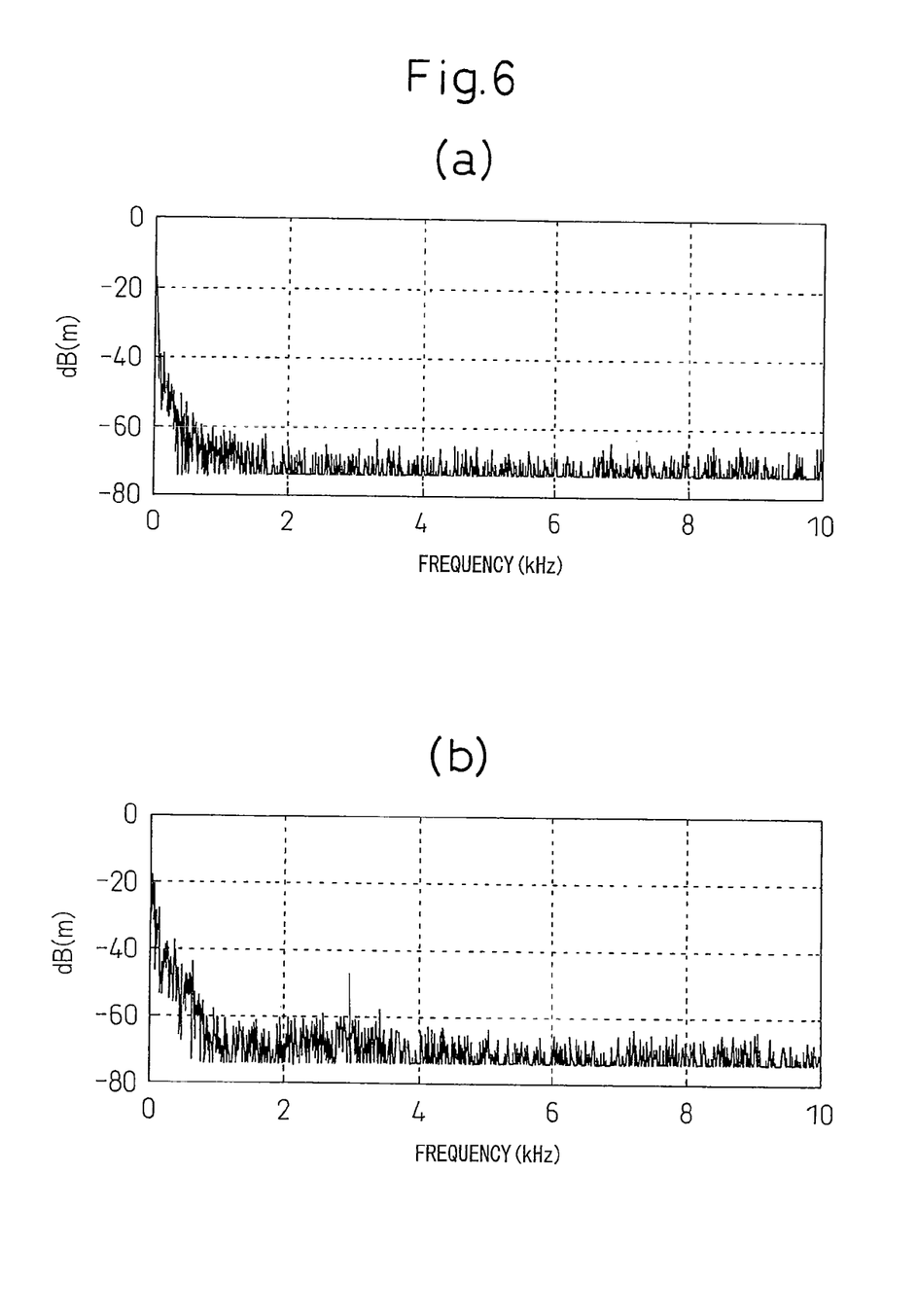
FIG. 6 is a view showing an example of the results of frequency analysis of a normal bearing and abnormal bearing measured by contact of a sensor by the method and system of the present invention.

FIG. 6 shows the analysis results obtained by bringing a microphone into contact with the bearing when the outer race cracks in a self-aligned roller bearing of a continuous casting machine rotating at 3 rpm.

FIG. 6(a) shows the sound spectrum of a normal bearing. This example is also an example where screening by listening to the sound would lead to diagnosis of no abnormality probably being present. A sound pressure of 1 kHz or less due to the natural frequency or contact resonance was dominant. No peaks were seen at 1 kHz or more.

FIG. 6(b) shows the sound spectrum of a damaged bearing. Near 3 kHz, a sharp peak is seen. It could be judged that a crack had occurred resulting in contact of the rollers and broken face of the outer race of the bearing and the accompanying sound was remarkable.

In this example, unlike Example 1, it was not possible to clearly judge an abnormality by screening by sound without a filter, but it was also not possible to diagnose there was no abnormality. However, in this example, a 1 kHz or more high frequency band pass filter was used, so abnormalities could be clearly recognized.

Example 3

Figure 7:
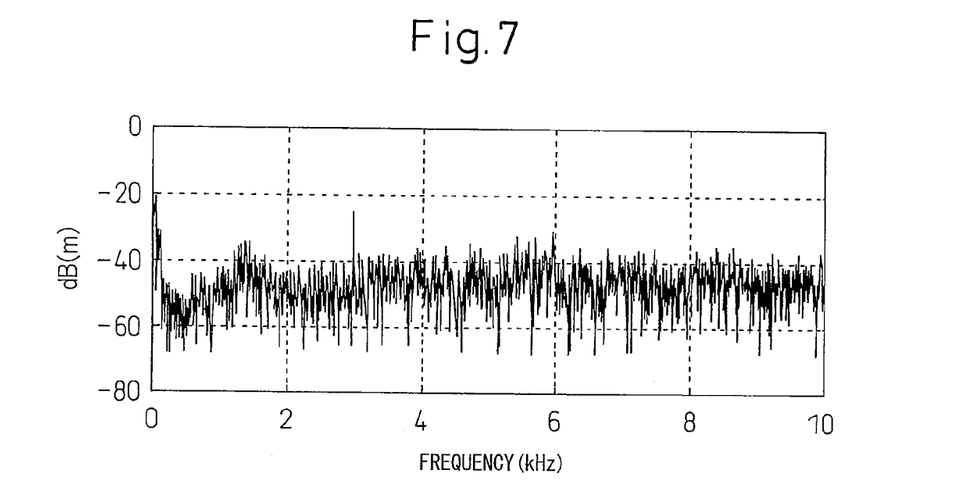
FIG. 7 is a view showing an example of the results of frequency analysis of an abnormal bearing measured by non-contact of a sensor by the method and system of the present invention.

FIG. 7 also shows the sound spectrum obtained by setting a microphone close to the bearings without contact in a facility the same as Example 2. This facility has cooling water or air ejection parts near where the microphone is set and therefore has large noise, but a peak could be confirmed near 3 kHz. By suitably setting the reference value of the spectral average value or effective value, it is possible to detect abnormalities.

In this example, abnormalities could not be judged with screening by sound using a filter due to the effects of noise, but according to the present invention, it became possible to judge abnormalities.

Example 4

Figure 8:
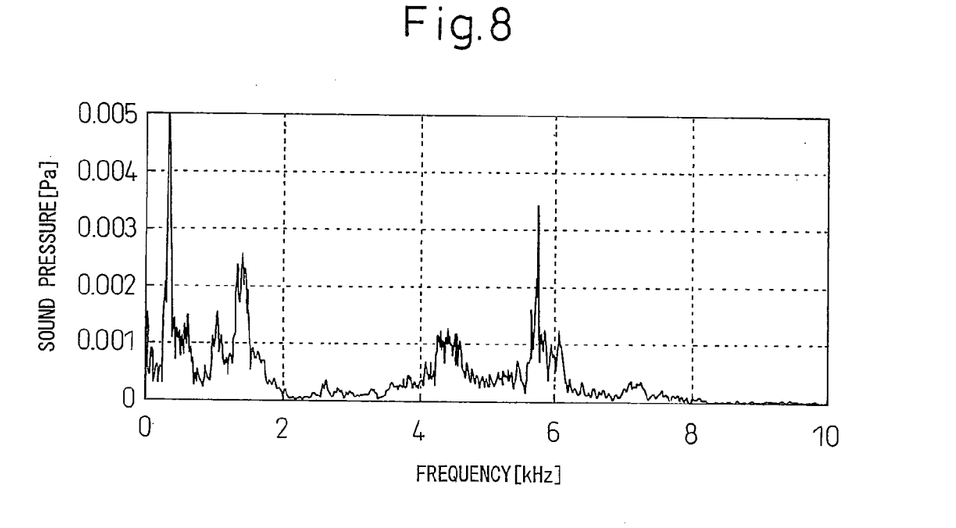
FIG. 8 is a view showing a sound spectrum obtained by bringing a microphone into contact with said bearing when cracks are formed in an outer race of a cylindrical roller bearing having a natural frequency of a relatively small about 800 Hz.

FIG. 8 shows the sound spectrum obtained by bringing a microphone into contact with cylindrical roller bearing rotating at 10 rpm and having a natural frequency of a relatively small approximately 800 Hz when the outer race of the bearing cracks. It could be confirmed that sound of a frequency of just under 6 kHz became larger.

As shown in this example, small-sized bearings have a high natural frequency, so a frequency region up to about 10 kHz was selected for diagnosis, but rotating machines of very low speeds of 10 rpm or less have many large-size bearings, so preferably an acoustic signal from natural frequency to 5 kHz is used for diagnosis.

As will be understood from the above, by using the abnormality diagnosis method according to the method and system of the present invention, it is possible to diagnose abnormalities of bearings of 10 rpm or less very low speed rotating machines inexpensively and precisely.

INDUSTRIAL APPLICABILITY

According to (1) of the present invention, a frequency spectrum of the natural frequency or more is used to judge for abnormalities, so it is easy to discern noise and possible to diagnose abnormalities with a higher accuracy than the conventional abnormality diagnosis of very low speed rotating bearings by vibration.

According to (2) of the present invention, since sound including a supersonic wave region propagating through a solid is received, it is possible to block out background noise propagated through the air and diagnose abnormalities in a manner superior in S/N ratio in accordance with the objective.

According to (3) of the present invention, it is possible to check for abnormalities of bearings by listening to the sound and possible to discover the possibility of abnormalities. Further, according to (4), it is possible to raise the accuracy of the screening since the effects of contact resonance are eliminated at the sensor.

(5) is a system for realizing the method of (1), (6) a system for the method of (2), (7) a system for the method of (3), and (8) a system for the method of (4).

According to the present invention, when there is damage, it is possible to diagnose the extent or degree of the damage of the bearings of a very low speed rotating machine precisely and thereby achieve safe inspection work and stable operation of facilities.

The invention claimed is:

1. A method for abnormality diagnosis of a roller bearing of a very low speed rotating machine comprising detecting an acoustic signal emitted from the roller bearing of the rotating machine accompanying a very low speed rotation of 10 rpm or less being diagnosed so as to diagnose any abnormality in the roller bearing,
said method for abnormality diagnosis of the roller bearing of the very low speed rotating machine comprising:
bringing a sensor having a sound pickup function into direct contact with said roller bearing to detect sound emitted from the roller bearing being detected as sound pressure, suitably amplifying it to obtain an acoustic signal, and finding a spectrum distribution of the same by frequency analysis;
finding a spectral average value or effective value of a frequency more than or equal to the natural frequency of the roller bearing and less than 10 kHz from a frequency analysis waveform obtained by said frequency analysis; and
comparing said spectral average value or effective value with a separately found reference value and judging the roller bearing to be abnormal when exceeding said reference value.

2. A method for abnormality diagnosis of a roller bearing of a very low speed rotating machine as set forth in claim 1, further comprising filtering out the natural frequencies of components of the rotating machine.

3. A method for abnormality diagnosis of a roller bearing of a very low speed rotating machine comprising detecting an acoustic signal emitted from the roller bearing of the rotating machine accompanying a very low speed rotation of 10 rpm or less being diagnosed so as to diagnose any abnormality in the roller bearing,
said method for abnormality diagnosis of the roller bearing of the very low speed rotating machine comprising:
bringing a sensor having a sound pickup function into direct contact with said roller bearing to detect sound emitted from the roller bearing being detected as sound pressure, suitably amplifying it to obtain an acoustic signal, and finding a spectrum distribution of the same by frequency analysis;
finding a spectral average value or effective value of a frequency more than or equal to the natural frequency of the roller bearing and less than 10 kHz from a frequency analysis waveform obtained by said frequency analysis;
comparing said spectral average value or effective value with a separately found reference value and judging the roller bearing to be abnormal when exceeding said reference value; and
outputting a signal obtained by amplifying said acoustic signal in an audible manner and screening the roller bearing for judgment of the abnormality.

4. A method for abnormality diagnosis of a roller bearing of a very low speed rotating machine as set forth in claim 3 wherein said acoustic signal is passed through a high frequency band pass filter of a frequency that is greater than or equal to the natural frequency of the roller bearing.

5. A system for abnormality diagnosis of a roller bearing of a very low speed rotating machine detecting an acoustic signal emitted from the roller bearing of the rotating machine being diagnosed along with a very low speed rotation of 10 rpm or less so as to diagnose an abnormality of the roller bearing,
said system for abnormality diagnosis of the roller bearing of the very low speed rotating machine comprising:
a sensor having a sound pickup function;
an amplifier amplifying an acoustic signal obtained by said sensor;
a frequency analysis part finding a frequency distribution of said acoustic signal;
a storage part of a natural frequency of the roller bearing;
a processing part finding a spectral average value or effective value of a frequency more than or equal to the natural frequency of the roller bearing and less than 10 kHz based on said frequency analysis;
a storage part storing a separately found reference value; and
an abnormality judgment part comparing said spectral average value or effective value with said reference value to judge if there is any abnormality,
wherein said sensor is configured to directly contact said roller bearing to thereby obtain said acoustic signal as sound pressure.

6. A system for abnormality diagnosis of a roller bearing of a very low speed rotating machine as set forth in claim 5, further comprising a filter filtering out the natural frequencies of components of the rotating machine.

7. A system for abnormality diagnosis of a roller bearing of a very low speed rotating machine detecting an acoustic signal emitted from the roller bearing of the rotating machine being diagnosed along with a very low speed rotation of 10 rpm or less so as to diagnose an abnormality of the roller bearing,
said system for abnormality diagnosis of the roller bearing of the very low speed rotating machine comprising:
a sensor having a sound pickup function;
an amplifier amplifying an acoustic signal obtained by said sensor;
a frequency analysis part finding a frequency distribution of said acoustic signal;
a storage part of a natural frequency of the roller bearing;
a processing part finding a spectral average value or effective value of a frequency more than or equal to the natural frequency of the roller bearing and less than 10 kHz based on said frequency analysis;
a storage part storing a separately found reference value;
an abnormality judgment part comparing said spectral average value or effective value with said reference value to judge if there is any abnormality; and
an output part outputting said amplified acoustic signal in an audible manner,
wherein said sensor is configured to directly contact said roller bearing to thereby obtain said acoustic signal as sound pressure.

8. A system for abnormality diagnosis of a roller bearing of a very low speed rotating machine as set forth in claim 7, further comprising being provided with a high frequency band pass filter extracting only a frequency band component of said amplified acoustic signal, wherein the frequency band includes a frequency that is greater than or equal to the natural frequency of the roller bearing.

* * * * *